US008107465B1

(12) United States Patent
Peterson et al.

(10) Patent No.: US 8,107,465 B1
(45) Date of Patent: *Jan. 31, 2012

(54) SLIM BANDWIDTH RESERVATION PROTOCOL OVER AN IP NETWORK

(75) Inventors: Eric Peterson, Westford, MA (US); Flavio Fernandes, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/475,186

(22) Filed: May 29, 2009

Related U.S. Application Data

(63) Continuation of application No. 10/361,626, filed on Feb. 11, 2003, now Pat. No. 7,558,256.

(51) Int. Cl.
*H04L 12/66* (2006.01)

(52) U.S. Cl. ........ 370/356; 370/352; 370/353; 370/354; 370/355; 709/201; 709/235; 709/242

(58) Field of Classification Search .... 348/14.01–14.16; 370/259–271, 351–356; 709/201–207, 217–244
See application file for complete search history.

(56) References Cited

U.S. PATENT DOCUMENTS

| 6,151,309 | A * | 11/2000 | Busuioc et al. | 370/328 |
|---|---|---|---|---|
| 6,282,192 | B1 | 8/2001 | Murphy et al. | |
| 6,600,735 | B1 * | 7/2003 | Iwama et al. | 370/352 |
| 6,650,619 | B1 * | 11/2003 | Schuster et al. | 370/230 |
| 6,765,921 | B1 | 7/2004 | Stacey et al. | |
| 6,768,726 | B2 * | 7/2004 | Dorenbosch et al. | 370/331 |
| 6,778,496 | B1 | 8/2004 | Meempat et al. | |
| 6,868,080 | B1 * | 3/2005 | Umansky et al. | 370/354 |
| 6,904,017 | B1 | 6/2005 | Meempat et al. | |
| 6,907,004 | B1 * | 6/2005 | Ramsey et al. | 370/235 |
| 6,956,820 | B2 * | 10/2005 | Zhu et al. | 370/230.1 |
| 7,023,839 | B1 * | 4/2006 | Shaffer et al. | 370/356 |
| 7,031,311 | B2 | 4/2006 | MeLampy et al. | |
| 7,082,120 | B2 * | 7/2006 | Saller | 370/352 |
| 7,133,923 | B2 | 11/2006 | MeLampy et al. | |
| 7,286,467 | B1 | 10/2007 | Sylvain | |
| 7,330,463 | B1 * | 2/2008 | Bradd et al. | 370/352 |
| 7,558,256 | B1 | 7/2009 | Peterson et al. | 370/356 |
| 7,656,866 | B2 * | 2/2010 | Banner et al. | 370/356 |
| 7,664,036 | B2 * | 2/2010 | Bye | 370/237 |
| 2001/0024438 | A1 * | 9/2001 | Sugiyama et al. | 370/352 |
| 2002/0009073 | A1 * | 1/2002 | Furukawa et al. | 370/352 |
| 2002/0024974 | A1 * | 2/2002 | Karagiannis et al. | 370/516 |
| 2002/0112073 | A1 | 8/2002 | MeLampy et al. | |

(Continued)

OTHER PUBLICATIONS

R. Braden et al.: "Resource Reservation Protocol (RSVP)—Version 1 Functional Specification," University of Michigan, Sep. 1997, pp. 1-112.

*Primary Examiner* — Hemant Patel
(74) *Attorney, Agent, or Firm* — Harrity & Harrity, LLP

(57) ABSTRACT

A media gateway is coupled to an Internet Protocol (IP) network through a router. The router and the media gateway communicate through a slim protocol that allows the media gateway to reserve connections over the IP network that have certain minimum bandwidth and latency attributes. The router handles the obtaining of the requested IP circuit for the client. The media gateways only need to execute a relatively simple client application and do not have to be independently capable of obtaining IP-QoS information from the IP network.

19 Claims, 8 Drawing Sheets

U.S. PATENT DOCUMENTS

| | | | |
|---|---|---|---|
| 2002/0114274 A1* | 8/2002 | Sturges et al. | 370/229 |
| 2002/0174208 A1* | 11/2002 | Morlitz | 709/223 |
| 2003/0012138 A1 | 1/2003 | Abdelilah et al. | |
| 2003/0091024 A1* | 5/2003 | Stumer | 370/352 |
| 2003/0219006 A1 | 11/2003 | Har | |
| 2004/0013090 A1* | 1/2004 | Cashiola et al. | 370/238 |
| 2004/0030797 A1 | 2/2004 | Akinlar et al. | |
| 2004/0131057 A1 | 7/2004 | Miyashita | |
| 2004/0214581 A1* | 10/2004 | Davis et al. | 455/452.2 |
| 2006/0010243 A1 | 1/2006 | DuRee | |

* cited by examiner

SLIM BANDWIDTH RESERVATION PROTOCOL OVER AN IP NETWORK

This application is a continuation of U.S. patent application Ser. No. 10/361,626, filed Feb. 11, 2003, the disclosure of which is incorporated herein by reference.

BACKGROUND OF THE INVENTION

A. Field of the Invention

This invention relates generally to voice over Internet Protocol (VoIP) network connections, and more particularly, to a protocol for reserving bandwidth over an IP network.

B. Description of Related Art

VoIP is a term used in IP telephony for a set of facilities for managing the delivery of voice information using the Internet Protocol (IP). In general, this means sending voice information in digital form in discrete packets rather than in the traditional circuit-committed protocols of the public switched telephone network (PSTN).

Quality of service (QoS) is a significant factor in developing VoIP networks. An acceptable voice call should maintain minimum bandwidth and latency levels throughout the call. This is in contrast to traditional IP-based communications in which variable connection quality is acceptable. Accordingly, IP networks tend to not have native QoS guarantees.

In an effort to enable IP networks to provide guaranteed bandwidth data paths, protocols for reserving resources in an IP network have been developed. Such protocols include the resource reservation protocol (RSVP) and the CR-LDP protocol. Hosts running RSVP request specific qualities of service from a network for particular application data streams or flows. RSVP, however, from the perspective of the client devices running RSVP, can be a relatively complex protocol that occupies the place of a transport protocol in the protocol stack. Additionally, RSVP requires its clients to include a fairly large version of the IP stack.

There is a need in the art for a resource reservation protocol that overcomes the limitations of existing systems and methods.

SUMMARY OF THE INVENTION

A slim protocol for reserving QoS levels over an IP network is described that gives clients a real-time "digested" picture of the available QoS links without requiring the clients to actually query the IP network to obtain the QoS links.

A first aspect consistent with the invention is directed to a method that includes transmitting a first message to a router requesting a connection over an IP network to a specified destination. The connection has quality of service requirements. The method further includes receiving a second message from the router indicating whether the requested connection is available and transmitting data over the requested connection when the requested connection is available. Further, the method includes receiving a third message from the router when the needed connection quality of service requirements over the requested connection can no longer be met.

A second aspect consistent with the invention is directed to a system for completing a VoIP call. The system includes a voice gateway that links a PSTN to an IP network, the voice gateway includes a client component that is configured to transmit a message requesting a connection over the IP network to a second voice gateway. The system further includes a router in the IP network that includes a server component. The server component receives the message requesting the connection. The server component includes a first table and a second table. The first table is configured to store a list of media gateways. The second table is configured to store valid IP connections in the IP network and bandwidth and latency information associated with the valid IP connections.

Another aspect consistent with principles of the invention is directed to a network device. The network device includes a protocol handler component configured to interpret and respond to received messages exchanged in a connection reservation protocol. The messages are used to inform media gateways of IP connections having minimum specified bandwidth and latency specifications. The network device further includes a first table configured to store a list of other network devices using the connection reservation protocol and a second table configured to store the IP connections and the bandwidth and latency specifications associated with the IP connections.

Yet another aspect consistent with principles of the invention is directed to a method. The method includes receiving a first message requesting a connection over an IP network to a specified destination, the connection having connection quality of service requirements. The method further includes establishing a connection over the IP network having the connection quality of service requirements, transmitting a second message identifying the established connection, and transmitting a third message when the quality of service of the established connection falls below the connection quality of service requirements.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

A media gateway, such as a voice gateway, is functionally connected to an IP network through a router. The router and the media gateway communicate through a slim protocol, called the ISVoice protocol herein, that allows the media gateway to reserve connections over the IP network that have certain minimum bandwidth and latency attributes.

Network Overview

Figure 1:
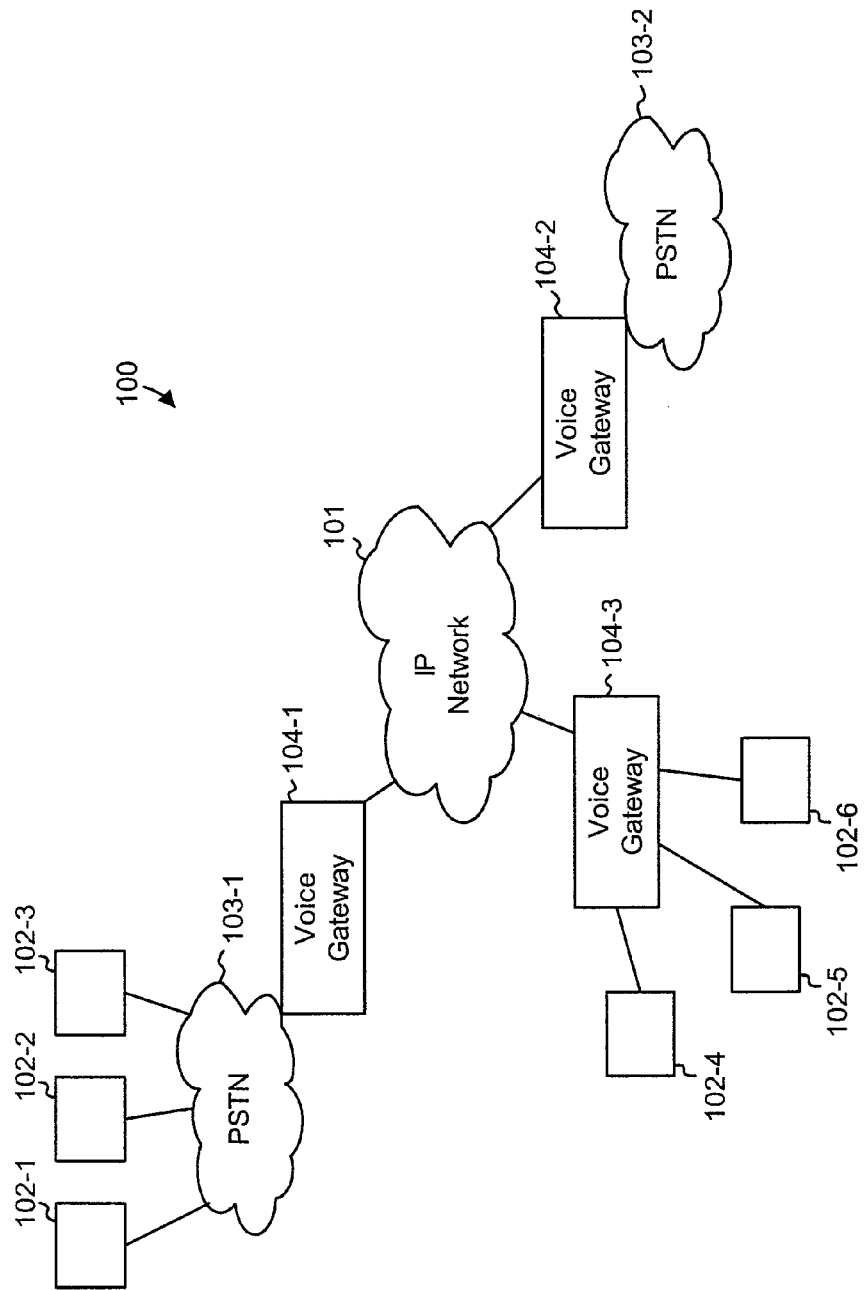
FIG. 1 is a diagram illustrating an exemplary network consistent with principles of the invention.

FIG. 1 is a diagram illustrating an exemplary network 100 consistent with principles of the invention. Network 100 may be used to implement VoIP telephone calls. Telephone calls may originate and terminate at telephones 102-1 through 102-6. Telephones, such as telephones 102-1 through 102-3, may be connected to conventional public switched telephone networks (PSTNs) 103-1 and 103-2. Calls originating in PSTNs 103-1 and 103-2 may be converted into VoIP calls by voice gateways 104-1 and 104-2. Alternatively, telephones may be connected directly to a voice gateway, such as voice gateway 104-3, for direct conversion into a VoIP call.

Voice gateways 104 perform tasks similar to those performed by PSTNs 103 and additionally perform gateway functions between IP network 101 and PSTNs 103. More particularly, voice gateways 104 may be responsible for call origination, call detection, analog-to-digital conversion of voice, and creation of voice packets (CODEC functions). Voice gateways 104 may include optional features, such as voice (analog and/or digital) compression, echo cancellation, silence suppression, and statistics gathering.

Although voice gateways 104 are described herein as handling voice traffic, voice gateways 104 may be more generally referred to as media gateways that can also handle multimedia data streams, such as a video data stream.

ISVoice Protocol

The ISVoice protocol operates on voice gateways and routers in network 100 to allow voice gateways to request network connections. The ISVoice protocol will now be described in further detail.

Figure 2:
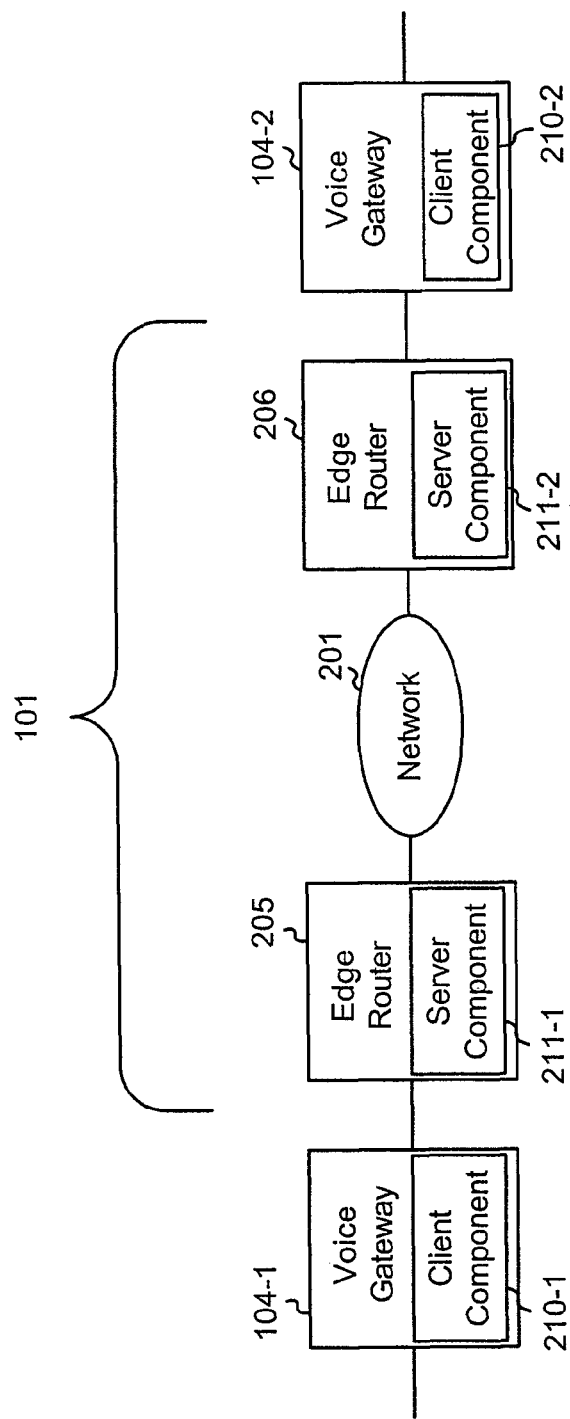
FIG. 2 is a diagram illustrating portions of the network shown in FIG. 1 in additional detail.

FIG. 2 is a diagram illustrating portions of network 100. Two voice gateways, 104-1 and 104-2, are illustrated in FIG. 2. These voice gateways may connect to network 101 through edge routers 205 and 206. Edge routers 205 and 206 may connect to voice gateways 104-1 and 104-2 via any convenient IP protocol, such as TCP. Edge routers 205 and 206 are coupled to one another through IP network 201. Network 201 may include a number of internal routers, data links, and other computing devices (not shown) that transport data packets through network 201. Voice gateways 104-1 and edge router 205 may be coupled through a local area network. Similarly, voice gateway 104-2 and edge router 206 may be coupled through a second local area network.

Edge routers and voice gateways are generally well known in the art. Accordingly, the basic operation of these devices will not be described further.

Voice gateways 104, as part of their gateway function, receive voice calls from, for example, a PSTN network, and transmit the calls as a series of packets to a destination voice gateway. Thus, voice gateway 104-1 may receive a call, determine that voice gateway 104-2 is the appropriate destination gateway, and open a connection through network 101 on which the call is to be transmitted. When the callers begin speaking, the call is transmitted through voice gateway 104-1 and network 101 to voice gateway 104-2, which completes the call to the end user.

The bandwidth and latency requirements for a particular call being handled by the voice gateways may change depending on the type of call. Consistent with an aspect of the invention, voice gateways may, using the ISVoice protocol, request a connection through network 101 having minimum bandwidth and latency requirements from an edge router. Voice gateway 104-1, for example, may send messages to edge router 205 requesting a connection with a certain bandwidth and latency requirement. Edge router 205 then responds to voice gateway 104-1 based on the connections it can locate through network 201.

More particularly, the ISVoice protocol may be implemented between voice gateways and edge routers through software applications residing on the voice gateways and edge routers. These software applications are illustrated in FIG. 2 as client components 210-1 and 210-2, residing on voice gateways 104-1 and 104-2, respectively, and server components 211-1 and 211-2, residing on edge routers 205 and 206, respectively. Client component 210-1 communicates with server component 211-1 and client component 210-2 communicates with server component 211-2.

In general, a server component, such as server component 211-1, handles the creation of the IP connection between edge router 205 and edge router 206, which then creates the connection to voice gateway 104-2. Server component 211-1 may then present the IP connection to client component 210-1 as an "IP circuit." Server component 211-1 generally creates and manages the IP circuits at the request of client component 210-1. Server component 211-1 may, for example, implement an IP circuit through network 201 via an IP interface stacked above an L2 interface that fulfills the destination, bandwidth, and latency requirements of the IP circuit. From the point of view of client component 210, the IP circuit can be thought of simply as a connection to a particular destination and having given bandwidth and latency attributes.

Figure 3:
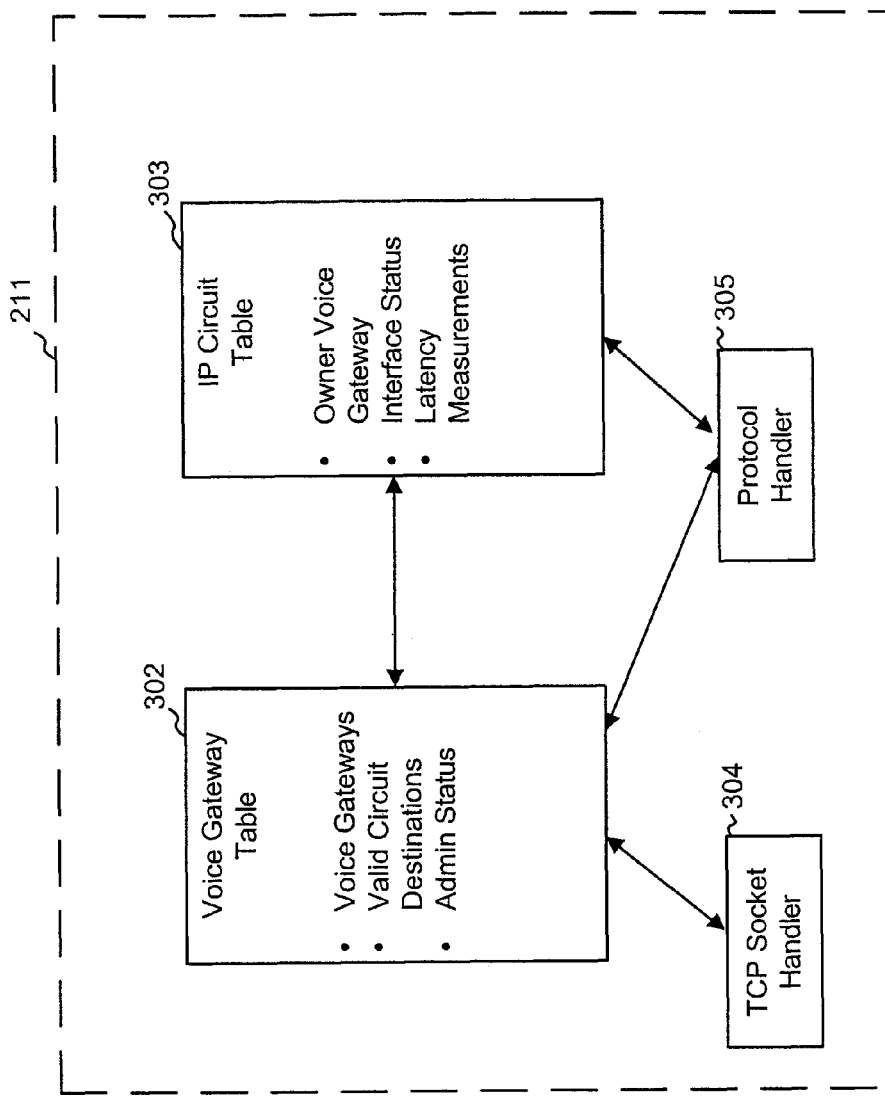
FIG. 3 is a diagram illustrating possible functional elements of a server component.

FIG. 3 is a diagram illustrating possible functional elements of one of server components 211. Server component 211 may maintain two tables: a daemon table 301 and an IP circuit table 303.

Voice gateway table 302 stores the identity of those voice gateways that are expected to connect to server component 211. Table 302 may additionally store attributes associated with each of the voice gateways. These attributes may include a list of the IP circuits each voice gateway is entitled to use based on the IP circuit destination address and administrative state information pertaining to the voice gateways.

IP circuit table 303 keeps track of the voice gateway that "owns" a particular IP circuit, keeps track of the state of the IP interface corresponding to each IP circuit, and keeps track of the current latency measurements for the IP circuits. In one implementation, the possible IP circuits are preconfigured into server component 211. In an alternate implementation, server component 211 may dynamically discover suitable IP circuits in network 101.

TCP socket handler 304 performs initial processing of data received via the TCP sockets of the router. TCP socket handler 304 may, for example, communicate with voice gateways 104 via a series of messages exchanged between TCP socket handler 304 and the voice gateways. Protocol handler 305 may interpret the received messages and generate outgoing messages that are consistent with the ISVoice protocol. Protocol handler 305 may also monitor the created IP circuits and update voice gateways 104 when the status of an IP circuit changes. TCP socket handler 304 may additionally store the TCP socket that is being used to communicate with the router and administrative status information for the router.

Figure 4:
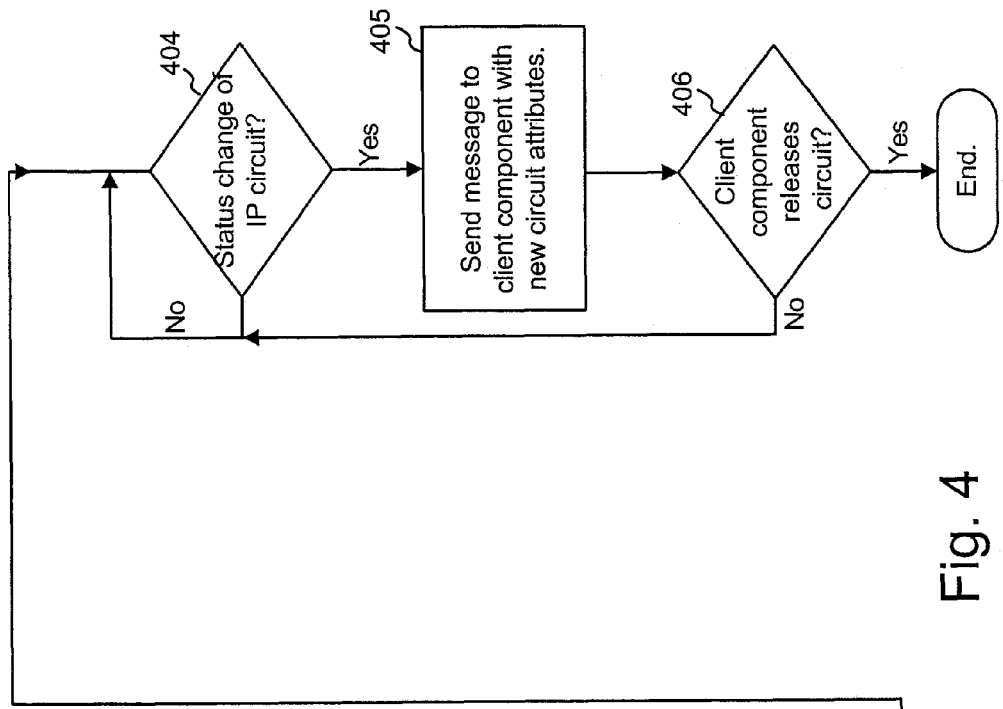
FIG. 4 is a flow chart illustrating a basic operation of the ISVoice protocol consistent with an aspect of the invention.
Figure 4:
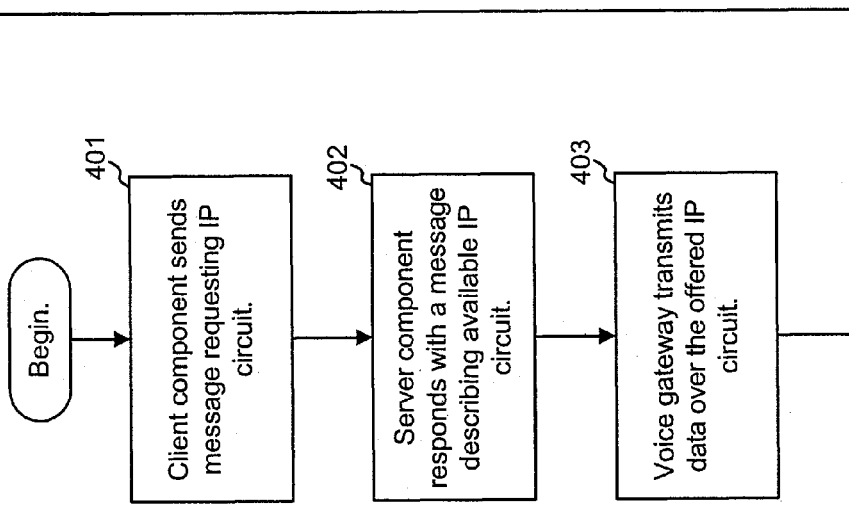

FIG. 4 is a flow chart illustrating a basic operation of the ISVoice protocol. One of client components 210, such as client component 210-1 of voice gateway 104-1, in response to receiving a call, may send a message to server component 211-1 (Act 401). The message requests an IP circuit to the destination specified by the call and having a minimum bandwidth and latency attributes required by the call. In response, server component 211-1 sends a message back to the voice gateway 210-1 confirming or denying the request (Act 402). The message may indicate that an IP circuit having the requested attributes is available. Alternatively, the message may indicate that the requested IP circuit is not available, but that an IP circuit having different attributes, such as a lower bandwidth or higher latency, is available. The voice gateway may then begin transmitting data over the offered IP circuit (Act 403). If the attributes of the IP circuit change, server component 211-1 may transmit a message to client component 210-1 informing the voice gateway of the new attributes (Act 404 and 405). Network failure, for example, may cause the IP circuit to lose its ability to supply the initial bandwidth level. Eventually, client component 210-1 may release the IP circuit (Act 406).

Figure 5:
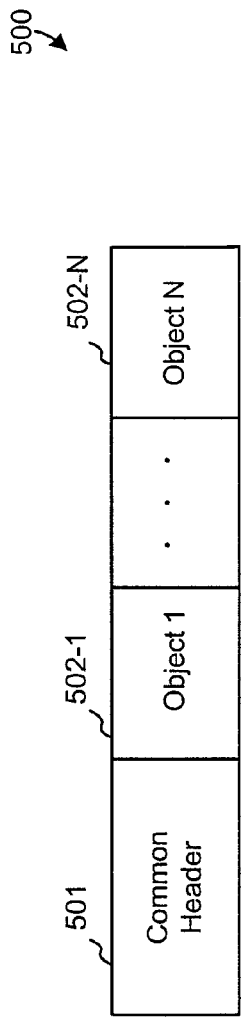
FIG. 5 is a diagram illustrating an exemplary format for a message exchanged consistent with an aspect of the invention.

As previously mentioned, client components 210 and server components 211 executing the ISVoice protocol communicate with one another by exchanging messages. FIG. 5 is a diagram illustrating an exemplary format for a message 500 exchanged consistent with an exemplary aspect of the invention. Message 500 includes a common header area 501 followed by one or more message objects 502-1 through 502-N.

Figure 6:
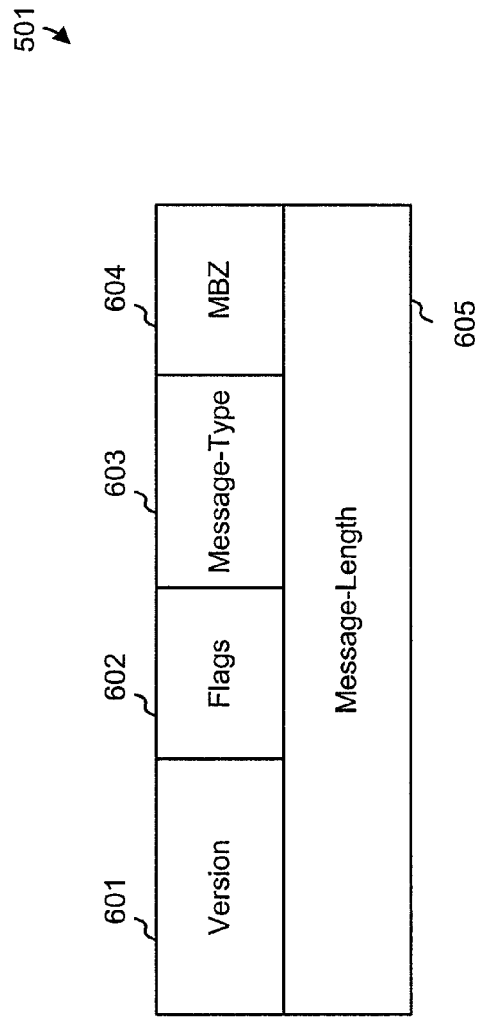
FIG. 6 is a diagram illustrating a header area of the message shown in FIG. 5.

FIG. 6 is a diagram illustrating header area 501 in additional detail. Header 501 may contain a version field 601, a flags field 602, a message-type field 603, an MBZ (must be zero) field 604, and a message length field 605. Version field 601 may be a four bit field that identifies the version of ISVoice that is being implemented by the sender of the message. Flags field 602 may be a four-bit field in which each bit is a flag that is either set or cleared. For example, one of the bits may be a flag that is set if an IP circuit is currently up and cleared if the IP circuit is down. Another bit, when set, may be a flag that indicates that latency information is not provided in the message and should be ignored. Other information may also be indicated by the bits in flags field 602. In alternate implementations, the entire field represents a value having a corresponding meaning.

Message-type field 603 may be an eight bit field used to identify the type of message. Possible message types for one potential implementation of the ISVoice protocol are shown below in Table I.

TABLE I

| Message-Type | Name | Direction | Comments |
|---|---|---|---|
| 0x01 | Keep Alive | VG <-> ROUTER | Message used to monitor health of TCP session. |
| 0x02 | IP Circuit Registration Request | VG -> ROUTER | Message used to add/update an IP circuit. |
| 0x03 | IP Circuit Unregistration Request | VG -> ROUTER | Message used to remove an IP circuit. |
| 0x04 | IP Circuit Report Request | VG -> ROUTER | Message used to explicitly request information about an IP circuit. |
| 0x05 | IP Circuit Event | VG <- ROUTER | Message used to notify changes in IP circuit. |
| 0x06-0xFF | Unused | | Open for future needs. |

In the implementation shown in Table I, the voice gateway sends messages to the edge router using one of four different message types ("Keep Alive", "IP Circuit Registration Request", "IP Circuit Unregistration Request", and "IP Circuit Report Request"). Similarly, the edge router sends messages to the voice gateway using one of two different message types ("Keep Alive" and "IP Circuit Event").

MBZ (must be zero) field 604 may be a 16-bit field that provides a level of error checking for a received message. MBZ field 604 should be set to zero. When a message is received, the receiving component may initially check the version field 601 and the MBZ field 604. The version number in version field 601 should match a recognized version number. MBZ field 604 should always be set to zero. If either of these states are not met in the message, the receiving component may generate an error.

Message-length field 605 may be a 32-bit field that contains the size of the message, in octets, including the common header 501 and all message objects 502. The message-length field 605 may be aligned on a 32 bit boundary.

Figure 7:
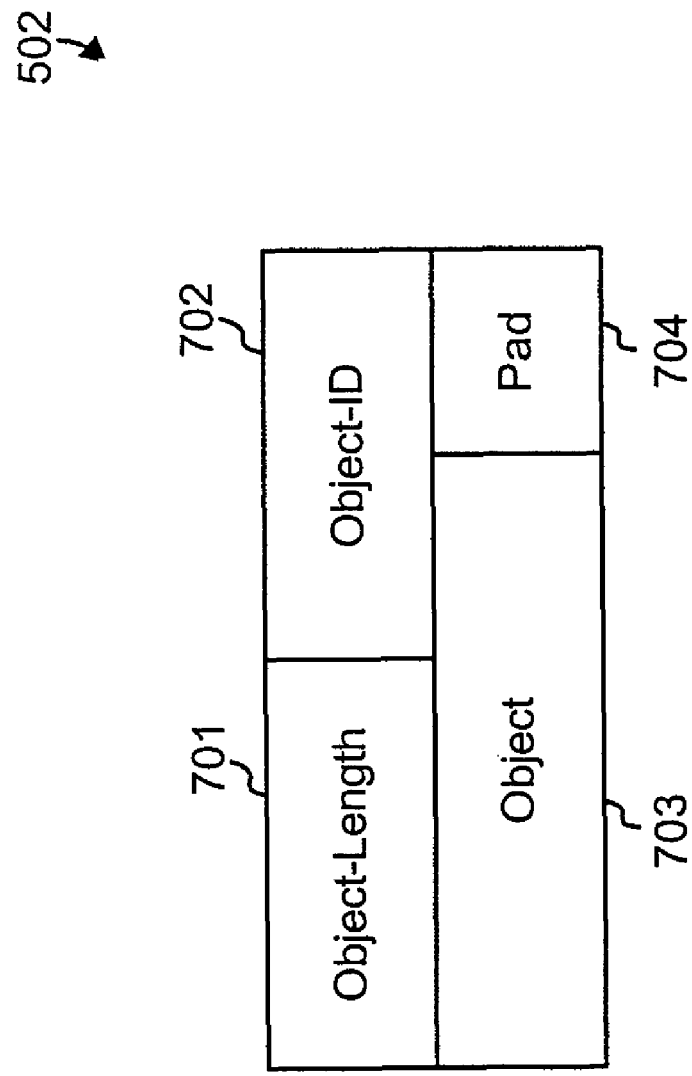
FIG. 7 is a diagram illustrating a message object of the message shown in FIG. 5.

FIG. 7 is a diagram illustrating a message object 502 in additional detail. Message object 502 may include object-length field 701, object-ID field 702, object field 703, and pad field 704. Object-length field 701 may be a 16-bit field that includes the size of the object, in octets. Object-ID field 702 may be a 16-bit field that identifies a type of the object. Table II, below, lists a number of possible object types according to an implementation consistent with the invention. Object field 703 may be a variable length field that includes the actual object body. The object body is interpreted by the receiving component based on the object type in object-ID field 702. Because objects 502 are aligned on octet boundaries, pad field 704 may be needed to pad an object to an octet boundary. Pad field 704 is generally ignored.

TABLE II

| Object-ID | Name | Comments |
|---|---|---|
| 0x0001 | IP Circuit ID | Uniquely identifies an IP circuit. |
| 0x0002 | IP Circuit Attributes | Provides the attributes of an IP circuit. |
| 0x0003 | IP Circuit Event | Provides feedback on an IP circuit. |
| 0x0004-0xFFFE | Unused | Open for future needs. |
| 0xFFFF | Keep Alive | Provides keep alive information. |

Referring to Table II, the objects transmitted in messages 500 provide a relatively simple information set between server components 211 and client components 210 that describe an IP circuit created through network 201.

Figure 8:
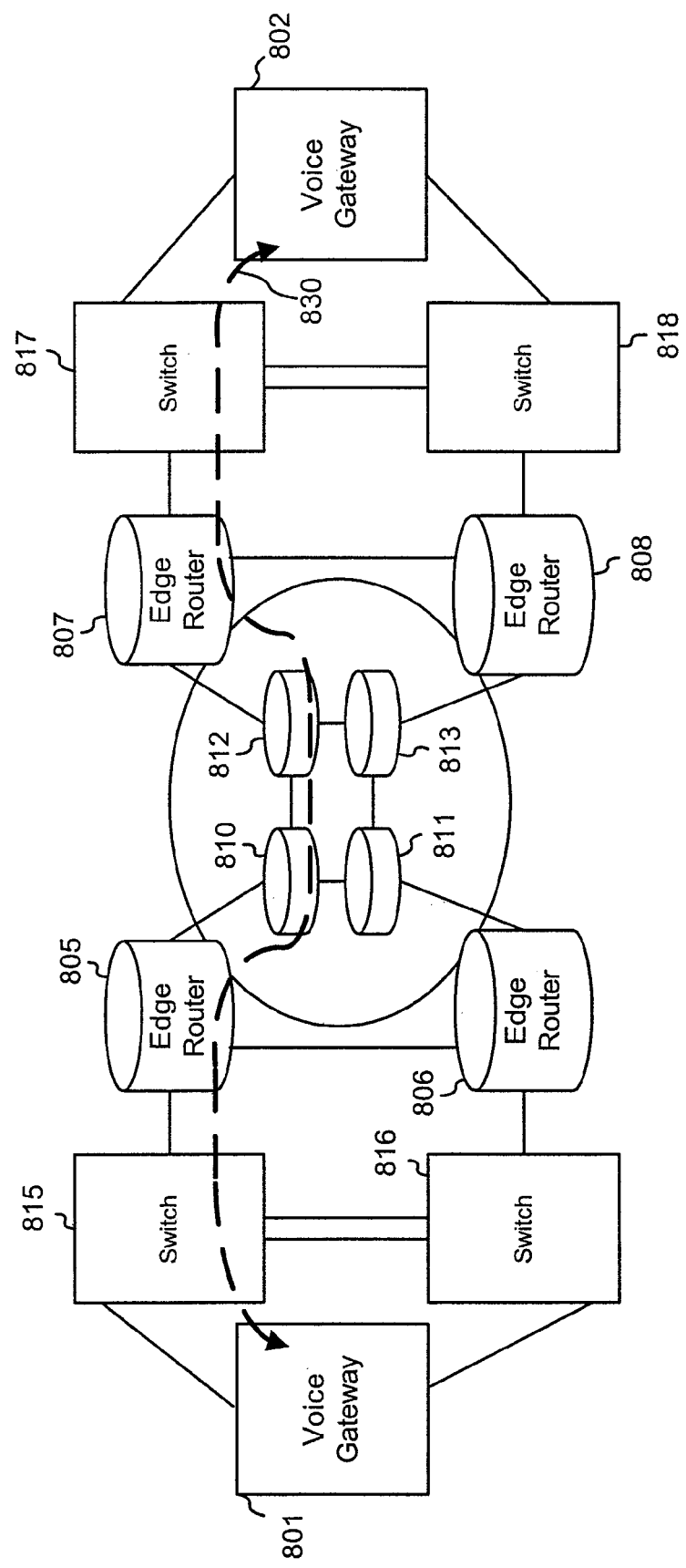
FIG. 8 is a diagram illustrating the network shown in FIG. 2 and including surrounding edge routers and voice gateways.

FIG. 8 is a diagram illustrating network 201 (FIG. 2), including surrounding edge routers and voice gateways, in additional detail. Multiple edge routers 805-808 connect to internal "core" routers 810-813. Switches 815 and 816 connect voice gateway 801 to edge routers 805 and 806, and switches 817 and 818 connect voice gateway 802 to edge routers 807 and 808.

An exemplary end-to-end connection 830 is shown in FIG. 8 between voice gateways 801 and 802. The IP circuit portion of this connection is formed between edge router 805 and edge router 807. In one implementation, the IP circuit portion of connection 830 may be negotiated by edge router 805 using the multiprotocol label switching (MPLS) protocol. MPLS is a well known protocol that enables traffic engineering over networks. MPLS generally involves setting up a specific path, called a label switched path (LSP), for a given sequence of packets, identified by a label put in each packet, thus saving the time needed for a router to look up the address to the next packet forwarding node.

Figure 9:
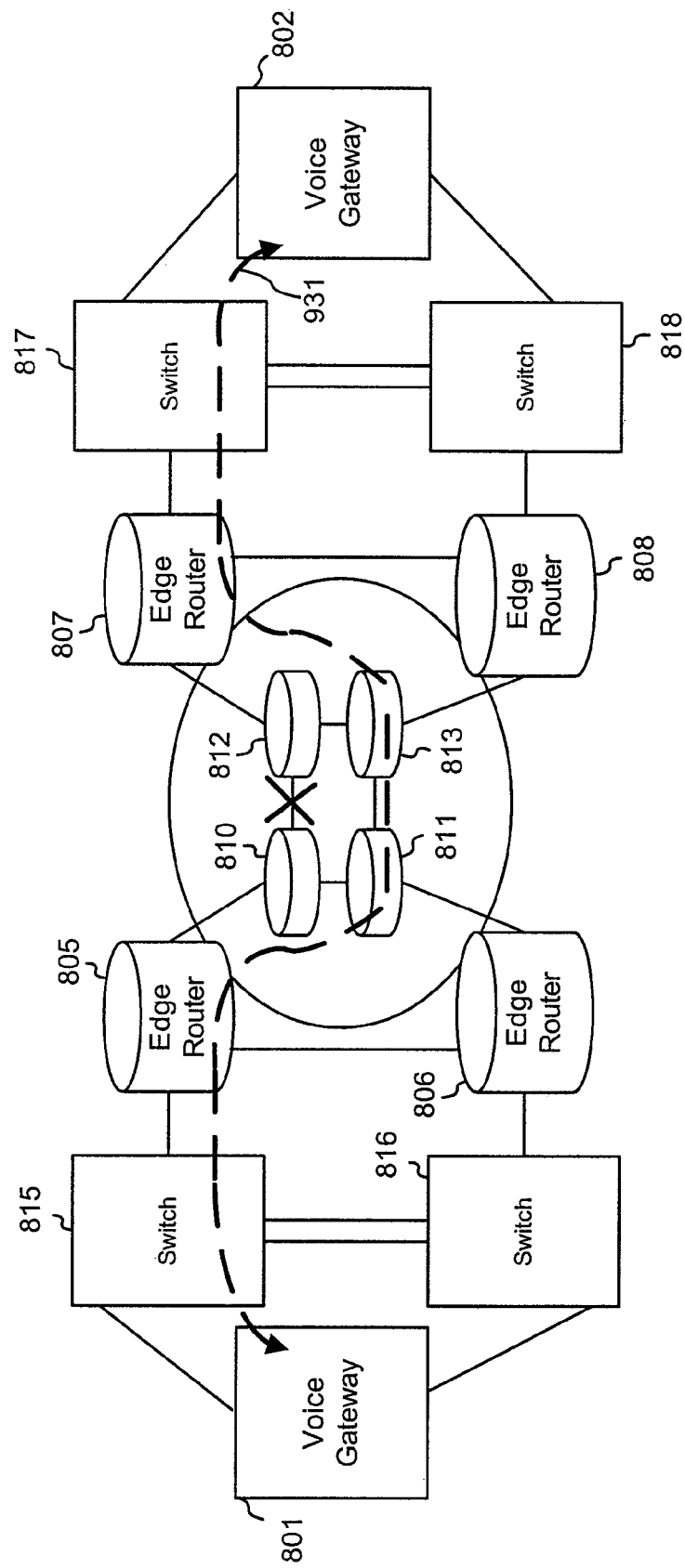
FIG. 9 is a diagram illustrating the network shown in FIG. 8 in which failed connection occurs between routers.

FIG. 9 is a diagram illustrating the network shown in FIG. 8. In FIG. 9, however, the end-to-end connection between voice gateways 801 and 802, labeled as end-to-end connection 931, takes a different path through routers 810-813. In this situation, assume that the connection between routers 810 and 812 has failed. MPLS includes a fast reroute feature allowing the new connection 931 to be formed that bypasses the failed link.

As is illustrated in FIGS. 8 and 9, the LSPs through network 201 that implement the IP circuits seen by edge routers 801 may be dynamically modified via a protocol such as the MPLS protocol. From the point of view of voice gateway 801, the IP circuit that the voice gateway is using does not change. Voice gateway 801 is not aware of, and does not need to be configured to run, the MPLS protocol. Instead, through operation of the ISVoice protocol, edge routers 805-808 handle this aspect of the connection for the voice gateways. If, however, the new connection shown in FIG. 9 does not meet the previously given bandwidth requirement, the ISVoice protocol will send a message from edge router 805 to voice gateway 801 indicating as much.

CONCLUSION

The ISVoice protocol, as described above, allows media gateways to reserve connections of a specified quality over an IP network. The media gateways only need to execute a relatively simple client application and do not have to be independently capable of reserving IP-QoS information from the IP network. The client requests IP circuits having specified bandwidth and latency requirements from a router running a corresponding software component. The router handles the obtaining of the requested IP circuit for the client.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

Moreover, while a series of acts has been presented with respect to FIG. 4, the order of the acts may be different in other implementations consistent with principles of the invention. In particular, non-dependent acts may be implemented in parallel. Additionally, lines with arrows are used in the figures to generally illustrate the flow of data. In practice, embodiments consistent with the principles of the invention may send data on these lines in both directions.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method comprising:
    transmitting a first message to a router, the message requesting a connection over an Internet Protocol (IP) network to a specified destination, the message including information indicating particular quality of service requirements for the requested connection, where the information indicating the particular quality of service requirements includes bandwidth and latency attributes associated with the requested connection;
    receiving a second message from the router indicating whether the requested connection is available;
    transmitting data over the requested connection when the requested connection is available; and
    receiving a third message from the router when the particular connection quality of service requirements can no longer be provided via the requested connection.

2. The method of claim 1, where the first message is transmitted by a voice gateway, and where the second message and the third message are received by the voice gateway.

3. The method of claim 2, where the transmitted data is data of a voice over Internet Protocol (VoIP) telephone call established via the voice gateway.

4. The method of claim 3, where the specified destination is a second voice gateway.

5. The method of claim 1, where the router establishes the requested connection using a label switching protocol.

6. The method of claim 1, where the router is an edge router in the IP network.

7. A system comprising:
    a voice gateway that links a public switched telephone network (PSTN) to an Internet Protocol (IP) network, the voice gateway including a client component to transmit a message requesting a connection over the IP network to a second voice gateway, where the message includes information indicating a minimum quality of service level requested by the voice gateway for the requested connection; and
    a router in the IP network, the router including a server component to receive the message requesting the connection over the IP network, where a first group of IP connections, of a plurality of IP connections is used to establish the connection based on the requested minimum quality of service level.

8. The system of claim 7, where the IP connections include label switched protocol connections.

9. The system of claim 7, where the server component transmits a second message to the client component relating to establishment of the requested connection.

10. The system of claim 9, where the server component transmits a third message to the client component when a quality of service level of the required connection falls below the requested minimum quality of service level.

11. The system of claim 7, where the server component comprises:
    a protocol handler component to interpret and respond to the message received from the client component.

12. The system of claim 11, where the server component further comprises:
    a Transmission Control Protocol (TCP) socket handler to initially process messages received via a TCP socket of the router.

13. The system of claim 7, where the server component establishes the requested connection using a label switching protocol.

14. The system of claim 7, where a second group of IP connections, of the plurality of IP connections, is used to establish the connection when the first group of IP connections is unable to establish the connection.

15. A method comprising:
    receiving, at a server, a first message requesting a connection to a destination device, the message including information regarding minimum bandwidth and latency requirements associated with the requested connection;
    sending, by the server, a second message, the second message indicating that the requested connection is not available, the second message indicating that a second connection associated with different bandwidth and latency attributes is available;
    establishing, by the server, the second connection to the destination device;

sending, by the server, a third message indicating that the bandwidth and latency attributes associated with the second connection are no longer available.

16. The method of claim 15, further comprising severing the second connection responsive to the third message.

17. The method of claim 15, further comprising establishing the second connection using the multiprotocol label switching protocol.

18. The method of claim 15, where the second connection is a label switched protocol connection.

19. The method of claim 15, where the first message is received from a voice gateway, and where the second message and the third message are transmitted to the voice gateway.

* * * * *

UNITED STATES PATENT AND TRADEMARK OFFICE
CERTIFICATE OF CORRECTION

| | | |
|---|---|---|
| PATENT NO. | : 8,107,465 B1 | |
| APPLICATION NO. | : 12/475186 | |
| DATED | : January 31, 2012 | |
| INVENTOR(S) | : Eric Peterson et al. | |

It is certified that error appears in the above-identified patent and that said Letters Patent is hereby corrected as shown below:

Claim 7 (Column 8, line 28) insert --,-- after "IP connections".

Signed and Sealed this
First Day of May, 2012

David J. Kappos
*Director of the United States Patent and Trademark Office*